June 9, 1931.  A. H. G. GIRLING  1,809,479

BRAKING MECHANISM

Filed March 28, 1929  2 Sheets-Sheet 1

A. H. G. Girling
INVENTOR

By: Marks & Clerk
Attys.

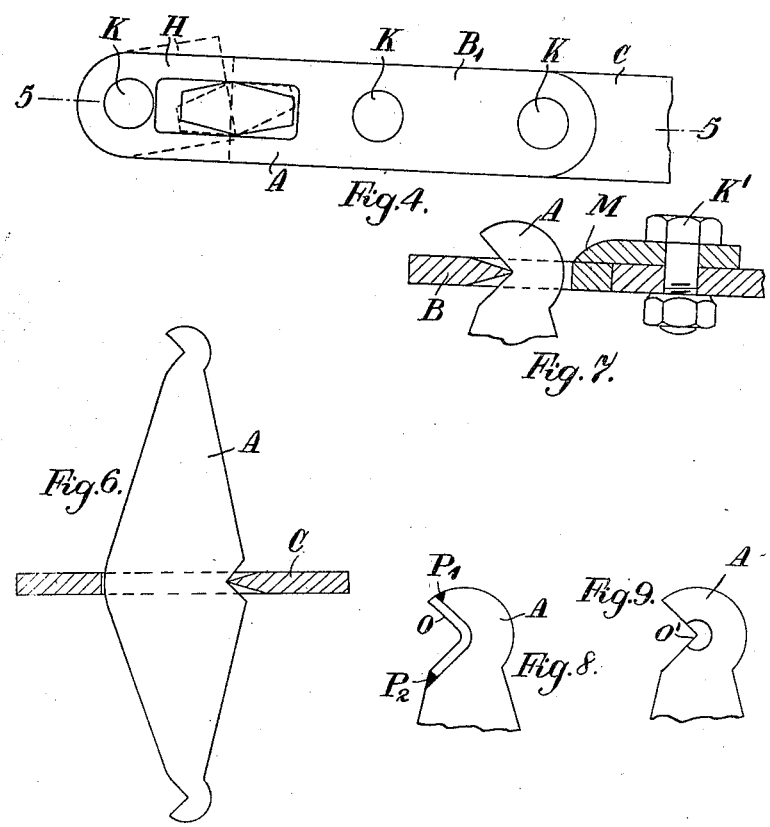

Patented June 9, 1931

1,809,479

UNITED STATES PATENT OFFICE

ALBERT HENRY GODFREY GIRLING, OF HARLOW, ENGLAND

BRAKING MECHANISM

Application filed March 28, 1929, Serial No. 350,673, and in Great Britain April 5, 1928.

This invention relates to braking mechanism, more particularly for self-propelled vehicles and has for its object a form of connection between a lever and rod or the fulcrum for a lever that is easy and cheap to make, light in weight, needs no lubrication, requires no protection from the elements or road materials, and will transmit nearly 100% of the operator's effort for long periods without attention.

According to the invention a simple knife-edge bearing is employed at every frictional joint in the control system. The end of each lever, which is preferably rectangular in section, is rounded in profile to a radius struck from a centre that coincides with the bottom of a V cut in the edge of the lever close to its end, so as to form a kind of hook, over which is slipped the end of the control rod, which is of flat section and is provided with a slot wide enough and long enough just to pass over the end of the lever; one end of the slot is formed to a knife-edge and rests in the bottom of the V in the lever.

When operated, the operative pull develops a force between the knife-edge and V slot, and these being free to rotate relatively through several degrees, the control effort and movement are transmitted with but little loss, and there being no friction, lubrication is not needed and (the dimensions and materials being correct) wear does not take place.

The slotted end may be in an operating rod, which may conveniently be of ribbon section, or the slotted piece may be detachable from the rod. It may be connected thereto by bolts or rivets or the like and elongated holes may be provided to allow for adjusting rod lengths. In cases where it is not possible to slip the slotted piece over the lever end except by having a long slot, the extra length of slot may be filled by a piece of metal bolted or held by suitable means on to the end piece after assembling on to the lever.

Experience shows that it is desirable to allow the knife-edge a slight amount of lateral swing, to ensure the working stresses being distributed evenly along the length of the knife-edge. This is effected according to the invention by making the knife-edge freely movable in relation to the rod or rod end by supporting it on a pivot, the pivot being carried in a kind of yoke end on the rod.

The accompanying figures will serve to more clearly indicate several ways in which my application may be applied, but other constructions would naturally be developed as experience accumulated and the necessity arose. Similar index figures are used for parts having similar functions in each figure.

In the accompanying drawings,

Fig. 4 is a plan view of a lever having a knife-edge capable of rocking sideways.

Fig. 6 is a side view of a lever supported on a knife-edge pivot, and

Figs. 7 to 9 show side views of the ends of levers having modified constructions of knife-edge.

Figure 1:
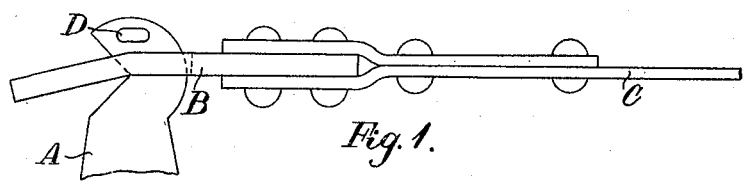
Fig. 1 is a side view and Fig. 2 the end view of a lever with a rod assembled therewith.
Figure 2:
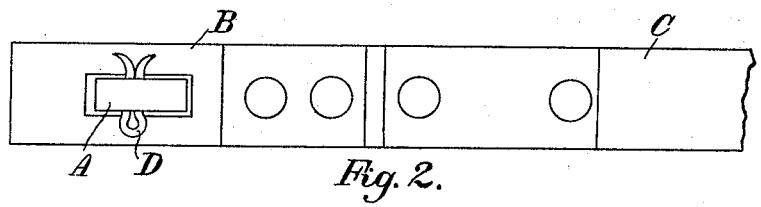

Referring to Figs. 1 and 2, the lever end is of rectangular section, a notch being formed in one edge, shown in the figure to subtend 90 degrees, but any other convenient angle could be used. The opposite edge of the lever is formed to a curve centered at the root of the notch. The rectangular slot should fit over the lever end, with a working clearance all round. If machined correctly, that is to say if the slot has a length such that it allows the lever to rock freely within it with a clearance less than the depth of the notch between the edge of the slot opposite the knife edge and the edge of the lever opposite the notch, it should be impossible to slip the end of the rod off the lever except by rotating it to an angle that cannot be reached when in its operative position, but in some cases there might be risk of the rod dropping off the lever. In this case, a small hole may be drilled in the lever close to its end and a small split pin D, rivet or screw fitted that would positively prevent such an event. The rod is fitted with a hardened end piece B formed with a rectangular hole just large enough to be placed over the end of the lever A, the edge of the rectangular hole engaging the root of the notch being formed to a knife-edge. However, since a minimum degree of friction is not necessary and the joint must resist abuse, the root of the notch and the knife-edge are both rounded off to small radii, that of the root being greater than that of the edge.

The knife-edge may be produced very simply. The first operation is to punch a rectangular hole in a piece of flat metal, the blank punched out being left attached at one end but standing up at its other end at an angle of about 30 degrees from the flat face of the metal. This tongue or blank is then ground off or cut away by any suitable method and leaves that end of the rectangular hole as a knife-edge of metal of about 30 degrees included angle. I may now, if desired, bend the metal in line with the knife-edge through an angle of about 15 degrees, to bring the latter so that its central section lies in the plane of one face of the flat metal, or this bending operation may be done in one with the punching operation before cutting the tongue of metal away.

Figure 3:
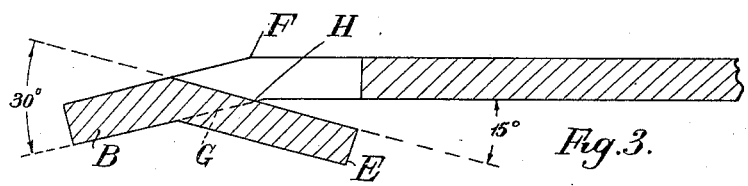
Fig. 3 is a longitudinal section of the end of the rod showing one method of producing the knife-edge.
Figure 5:
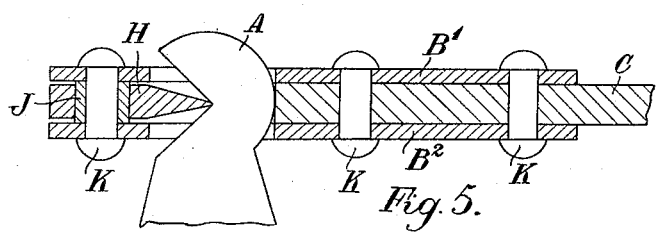
Fig. 5 is a longitudinal section on the line 5—5 of Fig. 4.

Referring to Figure 3, B is the end, a tongue of metal equal in width to the required slot is pressed up at E, the end being bent at F at the same operation, the tongue E is now cut away as shown above the line G and the resulting sharp edge H is rounded off leaving an end as shown in Figure 1. The edge is shown to subtend an angle of 30 degrees, which is convenient for many purposes, but is not an essential angle.

Where lateral swing is desirable, the rod end shown in Figures 4 and 5 is used. The rod C is fitted with two side pieces $B_1$ and $B_2$, slotted to receive the lever end, a bush J lies between the ends of the side pieces, held by the rivet K, and the edge H is mounted freely on J. By this method, whilst the rod and lever are held in correct relationship the knife-edge can rock sideways as shown by interrupted lines to obtain a full width bearing in the root of the notch. In order that the lever end may fit closely sideways in the rectangular space in the rod end and yet allow the rod end to swing freely sideways, the section of the lever end, at the root of the notch, is preferably tapered as shown in Figure 4.

Figure 6 shows how the fulcrum of a lever may be arranged. The lever A has one of its edges at the fulcrum notched as above described, the opposite edge being formed to a circumference struck from the root of the notch. A supporting plate or bracket C is formed with a slot that closely fits round the lever, one end of the slot being formed to a knife-edge which may be made by any convenient method, such as the method illustrated by Figures 3 or 4 and 5.

In some cases the lever might rotate through the extreme angle allowed by the assembly and it might be possible for the rod end to slip off the lever. In any case, it is preferable to provide a spring to keep the two parts in constant mesh, but as a further measure of safety, a split pin D may be fitted. This is also useful in those cases where for any reason it is difficult to slip a close fitting rod end over the lever, and an elongated slot has to be provided in the end B. In such a case, the circumference opposite the notch would not be essential. In other cases the modification shown in Figure 7 may be used, in which the elongated slot in the rod end B is filled after assembly to the lever end by a piece M, held by a bolt K'.

To reduce or eliminate wear, the knife-edges and the surfaces they bear upon must be of the correct material to stand the imposed loads; in some cases ordinary unhardened metal would do, in others one or both of the contracting parts would have to be of hardened steel. In some cases it might not be convenient to harden a complete lever, and a better plan would be to use hardened inserts at the bearing points. Figures 8 and 9 show two methods. Figure 8 shows a small piece of hardened steel O welded at $P_1$ and $P_2$ to the lever A, and Figure 9 a small hardened insert O' forced into a hole in A. These pieces and the knife-edges could be made from hardened rustless steel, in which case wear due to corrosion would be prevented.

Although illustrated as of rectangular section, the connecting rods may be of any section or may be cables, or the like.

What I claim is:—

1. In combination, a lever having a notch formed in one edge thereof and having its opposite edge formed to a circumference struck from the root of the notch and a rod having a slot near one end and a knife edge at one end of said slot, said lever being passed into said slot with the knife edge in engagement with the notch and bearing at the root of the notch, said slot being elongated so as to allow the lever to be passed freely into it, and a filling piece attached to the rod in proximity to the edge of the lever opposite the notch and passed into the slot so as to fill the excess length of the slot adjacent said edge, as and for the purposes set forth.

2. In combination, a lever having a notch formed in one edge thereof and having its opposite edge formed to a circumference struck from the root of the notch and an actuating member having a slot near one end, and a knife-edge at one edge of said slot, said lever being passed into said slot with the knife-edge in engagement with the notch and bearing at the root of the notch and having a taper section so as to enable it to swing freely sideways in the slot and at the same time fit closely sideways, as set forth.

In testimony whereof I have signed my name to this specification.

ALBERT HENRY GODFREY GIRLING.